United States Patent
Park et al.

(10) Patent No.: US 11,795,311 B2
(45) Date of Patent: Oct. 24, 2023

(54) POLYPROPYLENE RESIN COMPOSITION WITH IMPROVED SCRATCH RESISTANCE AND VEHICLE MOLDED PARTS MANUFACTURED THEREFROM

(71) Applicant: GS CALTEX CORPORATION, Seoul (KR)

(72) Inventors: Cheol-Hee Park, Daejeon (KR); Byung-Wook Kang, Suwon-si (KR); Won-Keon Seo, Sejong (KR)

(73) Assignee: GS CALTEX CORPORATION, Seoul (KR)

( * ) Notice: Subject to any disclaimer, the term of this patent is extended or adjusted under 35 U.S.C. 154(b) by 0 days.

(21) Appl. No.: 16/768,851

(22) PCT Filed: Oct. 30, 2018

(86) PCT No.: PCT/KR2018/013036
§ 371 (c)(1),
(2) Date: Jun. 1, 2020

(87) PCT Pub. No.: WO2019/107759
PCT Pub. Date: Jun. 6, 2019

(65) Prior Publication Data
US 2021/0163726 A1    Jun. 3, 2021

(30) Foreign Application Priority Data

Nov. 30, 2017  (KR) .......................... 10-2017-0163590

(51) Int. Cl.
*C08L 23/12* (2006.01)
*C08L 23/14* (2006.01)
*C08L 23/16* (2006.01)
*C08L 53/02* (2006.01)

(52) U.S. Cl.
CPC .............. *C08L 23/12* (2013.01); *C08L 23/142* (2013.01); *C08L 23/16* (2013.01); *C08L 53/025* (2013.01); *C08L 2205/16* (2013.01); *C08L 2207/04* (2013.01)

(58) Field of Classification Search
CPC ........ C08L 23/12; C08L 23/142; C08L 23/16; C08L 53/025; C08L 2205/16; C08L 2207/04
See application file for complete search history.

(56) References Cited

U.S. PATENT DOCUMENTS

| | | | |
|---|---|---|---|
| 6,294,611 B1* | 9/2001 | Takayanagi | C08F 297/08 525/191 |
| 9,175,157 B2 | 11/2015 | Noh et al. | |
| 2006/0052544 A1 | 3/2006 | Watanabe et al. | |
| 2010/0204381 A1* | 8/2010 | Heck | C08L 23/12 524/447 |
| 2015/0159003 A1 | 6/2015 | Son et al. | |
| 2016/0376430 A1* | 12/2016 | Kusumoto | C08L 51/06 524/494 |
| 2017/0211225 A1* | 7/2017 | Maeda | C08F 8/42 |

FOREIGN PATENT DOCUMENTS

| | | |
|---|---|---|
| CN | 105339425 A | 2/2016 |
| EP | 2754691 A1 | 7/2014 |
| EP | 3020760 A1 | 7/2014 |
| JP | S58-213032 A | 12/1983 |
| JP | S62-91545 A | 4/1987 |
| JP | 2010-150322 A | 7/2010 |
| JP | 2013-67789 A | 4/2013 |
| JP | 2016-160294 A | 9/2016 |
| JP | 2016-183279 A | 10/2016 |
| KR | 10-2004-0054899 A | 6/2004 |
| KR | 10-2007-0017872 A | 2/2007 |
| KR | 10-2008-0069364 A | 7/2008 |
| KR | 10-1459951 B1 | 11/2014 |
| KR | 10-2015-0111305 A | 10/2015 |
| WO | 2015/005239 A1 | 1/2015 |
| WO | 2016166072 A1 | 10/2016 |

OTHER PUBLICATIONS

Davide Pico et al., "Fibers 12. Glass Fibers," Ullmann's Encyclopedia of Industrial Chemistry, available online in 2012.*
Wikipedia entry for Mineral Wool, https://en.wikipedia.org/wiki/Mineral_wool, accessed Jan. 23, 2022.*
European Search Report dated Dec. 9, 2020, in connection with corresponding European Patent Application No. 18884807.1.
International Search Report dated Apr. 25, 2019, in connection with corresponding International Patent Application No. PCT/KR2018/013036.
Japanese Office Action dated Jun. 18, 2021 in connection with the corresponding Japanese Patent Application No. 2020-529436.
Chinese Office Action dated Sep. 21, 2022, in connection with the Chinese Patent Application No. 201880077863.5, 12 pages, citing the above reference(s).

* cited by examiner

*Primary Examiner* — Angela C Scott
(74) *Attorney, Agent, or Firm* — Hauptman Ham, LLP

(57) ABSTRACT

Provided is a polypropylene resin composition which imparts excellent impact resistance by comprising polypropylene resin, a thermoplastic elastomer, and a wool-like inorganic filler, and simultaneously imparts dimensional stability through control of low shrinkage and orientation, and also has very excellent scratch resistance.

7 Claims, No Drawings

POLYPROPYLENE RESIN COMPOSITION WITH IMPROVED SCRATCH RESISTANCE AND VEHICLE MOLDED PARTS MANUFACTURED THEREFROM

CROSS REFERENCE TO RELATED APPLICATION

This present application is a national stage filing under 35 U.S.C § 371 of PCT application number PCT/KR2018/013036 filed on Oct. 30, 2018 which is based upon and claims the benefit of priority to Korean Patent Application No. 10-2017-0163590 filed on Nov. 30, 2017 in the Korean Intellectual Property Office. The disclosures of the above-listed applications are hereby incorporated by reference herein in their entireties.

TECHNICAL FIELD

The present disclosure relates to a polypropylene resin composition with improved scratch resistance, and a molded part for a vehicle made of the polypropylene resin composition.

DESCRIPTION OF RELATED ART

A polypropylene composite resin has excellent moldability, impact resistance, chemical resistance, etc., and has low specific gravity and low cost, and thus, is widely used for parts for vehicles such as bumpers, instrument panels, door trim panels, and interior trims as components that require both safety and functionality. Although the polypropylene resin composition as developed so far is excellent in terms of physical properties such as rigidity and scratch resistance, and impact resistance, a molded part made of the polypropylene resin composition has a surface appearance defect and a scratch when a painting is not formed thereon. Thus, in a state in which a painting is not formed on the polypropylene resin composition, the polypropylene resin composition has not been widely applied in an actual industrial field.

Currently, interior parts for vehicles, such as instrument panels, door trim panels, and interior trims are being produced in a molded-in-color process that does not require a post-injection painting process to reduce production costs. Since the painting is not carried out, the interior part is very vulnerable to a scratch, such that a surface of the molded interior part is easily damaged by a driver's and passenger's hand and shoe, or the surface of the part is contaminated, resulting in poor appearance. Therefore, the resin composition used for the interior part for a vehicle should have improved impact strength, rigidity, scratch resistance, and antistatic properties, while being able to satisfy both safety and emotional effects at the same time.

In addition, it is an urgent challenge to develop a polypropylene composite resin having fluidity required for an injection molding process and dimensional stability as a thickness of the part for the vehicle decreases as the vehicle becomes lighter.

The interior part for the vehicle that is commonly used has been produced by injection-molding a mixture in which polyolefin rubber and various inorganic fillers are added to polypropylene. However, in this case, a compromising relationship between the impact resistance and the scratch resistance as mentioned above is always present. Further, excellent impact resistance may not be achieved when using a material with excellent flowability for good injection moldability.

Therefore, it is urgent to develop an interior material for a vehicle, particularly, an instrument panel material, having excellent scratch resistance and moldability while having appropriate impact resistance.

DISCLOSURE

Technical Purposes

One implementation of the present disclosure provides a polypropylene resin composition with improved scratch resistance.

Another implementation of the present disclosure provides a molded part for a vehicle as an injection-molded part of a polypropylene resin composition with improved scratch resistance.

Technical Solutions

In one embodiment of the present disclosure, there is provided a polypropylene resin composition having improved scratch resistance, the composition containing polypropylene resin, thermoplastic elastomer, and wool-like inorganic filler.

In another embodiment of the present disclosure, there is provided a molded part for a vehicle as an injection-molded part of a polypropylene resin composition having improved scratch resistance.

Technical Effects

The polypropylene resin composition having the improved scratch resistance contains the wool-like inorganic filler to impart excellent impact resistance, and at the same time, impart dimensional stability via low shrinkage and orientation control, and excellent scratch resistance.

DETAILED DESCRIPTIONS

Hereinafter, implementations of the present disclosure will be described in detail. However, the implementations as presented as an example. Thus, the present disclosure is not limited thereto. The present disclosure is only defined by a scope of claims to be described later.

In one implementation of the present disclosure, there is provided a polypropylene resin composition having improved scratch resistance, the composition containing polypropylene resin, thermoplastic elastomer, and wool-like inorganic filler. The wool-like inorganic filler includes one selected from a group consisting of silica, aluminum oxide, calcium oxide, potassium oxide, magnesium oxide, sodium oxide, iron oxide, and combinations thereof. Optionally, the polypropylene resin composition may further contain a plate-like inorganic filler and/or a needle-like inorganic filler.

The polypropylene resin composition having improved scratch resistance contains the wool-like inorganic filler to impart excellent impact resistance, and at the same time, not only impart dimensional stability via low shrinkage and orientation control, but also excellent scratch resistance.

Specifically, the wool-like inorganic filler contained in the polypropylene resin composition having the improved scratch resistance may include one selected from a group consisting of silica, aluminum oxide, calcium oxide, potassium oxide, magnesium oxide, sodium oxide, iron oxide and combinations thereof via chemical bonds. Thus, the wool-like inorganic filler may impart excellent impact resistance, and at the same time, may impart dimensional stability via low shrinkage and orientation control, and exceptionally good scratch resistance.

In this connection, the wool-like inorganic filler may have a length of about 200 nanometers or greater. The wool-like inorganic filler may have an average aspect ratio of about 50 or greater, thereby imparting excellent impact resistance, and, at the same time, imparting dimensional stability via low shrinkage and orientation control, and exceptionally good scratch resistance. Specifically, when each of the length and the aspect ratio of the wool-type inorganic filler is smaller than each of the above defined ranges, the inorganic filler may not impart mechanical properties such as impact resistance and rigidity, and may not enable the low shrinkage and orientation control effects, resulting in poor dimensional stability.

Specifically, a total content of the wool-like inorganic filler may be in a range of about 5 to about 30 parts by weight, based on 100 parts by weight of the polypropylene resin. The wool-like inorganic filler may be contained in a content of the above range, thereby imparting the excellent scratch resistance to the polypropylene resin, and imparting the impact resistance and dimensional stability thereto. More specifically, when the wool-like inorganic filler is contained in a content below the above range, the mechanical rigidity of the composition is not sufficiently improved, so that a shape of a molded part made of the composition may be easily deformed during handling of the part. To the contrary, when the wool-like inorganic filler is contained in a content exceeding the above range, the impact resistance of the composition may be lowered.

Further, when necessary, the plate-like inorganic filler and/or the needle-like inorganic filler may be further contained in the composition.

The polypropylene resin composition having the improved scratch resistance may contain the polypropylene resin as a base material. The polypropylene resin may include one selected from a group consisting of homo-polypropylene; random copolymers (a typical example thereof being ethylene-propylene copolymer) in which a comonomer selected from a group consisting of ethylene, butene, pentene, hexene, and octene is polymerized with propylene; a block copolymer in which ethylene-propylene rubber is copolymerized with polypropylene; branched polypropylene; and combinations thereof.

Specifically, the polypropylene resin may contain about 5% to about 10% by weight of ethylene. The polypropylene resin may be contained in the polypropylene resin composition having the improved scratch resistance in a content of about 40% by weight to about 90% by weight, thereby to impart economical and excellent workability, resulting in a cost reduction. The polypropylene resin may be contained in the composition together with the above-described wool-like inorganic filler, thereby to impart excellent mechanical strength and excellent impact resistance to the composition.

In this connection, the polypropylene resin contains about 5% to about 10% by weight of ethylene. In a specific example, the polypropylene resin may be a highly crystalline ethylene-propylene copolymer resin having a value of about 97 to about 99 of an isotactic index indicating stereo-regularity of a polymer as measured by 13C NMR. This highly crystalline ethylene-propylene copolymer resin may impart excellent rigidity and heat resistance to the composition.

Further, the polypropylene resin may have the isotactic index as defined above and at the same time, may have a melt flow rate of about 5 g/10 min to about 50 g/10 min as measured at a temperature of 230° C. and a load of 2.16 kg, thereby to impart not only excellent moldability but also excellent mechanical rigidity and impact resistance to the composition.

Further, the polypropylene resin may have a molecular weight distribution (weight average molecular weight/number average molecular weight, polydispersity index) of about 3 to about 7, specifically, about 4 to about 6, thereby to impart excellent mechanical properties and good moldability to the composition. Therefore, the polypropylene resin composition having the improved scratch resistance containing the polypropylene resin above defined may be greatly useful to produce an interior part for a vehicles as an injection-molded product of the composition, especially, a complicated molded part with a three-dimensional structure of complex area and thickness such as a crash pad.

The polypropylene resin composition having the improved scratch resistance may contain the thermoplastic elastomer. The thermoplastic elastomer may not be particularly limited, but may employ one known in the art. Examples thereof may include a polyolefin-based thermoplastic elastomer, a styrene-based hydrogenated block copolymer rubber, etc. These may be used alone or in combination of two or more.

More specifically, the polyolefin-based thermoplastic elastomer may include ethylene.α-olefin copolymer rubber such as ethylene propylene copolymer rubber, ethylene 1-butene copolymer rubber, ethylene 1-hexene copolymer rubber, and ethylene 1-octene copolymer rubber, ethylene.α-olefin non-conjugated diene copolymer rubbers such as ethylene propylene ethylidene norbornene copolymer rubber (EPDM), etc. These may be used alone or in combination of two or more.

The ethylene.α-olefin copolymer rubber may be obtained via polymerization using a Ziegler-type catalyst composed of a titanium aluminum compound such as titanium halide, an organic aluminum-magnesium complex such as alkyl aluminum-magnesium complex, or alkyl alkoxy aluminum-magnesium complex, and alkyl aluminum or alkyl aluminum chloride, etc. The polymerization method may include a production process such as a gas phase fluidized bed method, a solution method, and a slurry method.

Examples of the styrene-based hydrogenated block copolymer rubber may include a hydrogenation product of a styrene-butadiene-styrene triblock copolymer (SEBS), and a hydrogenation product of a styrene-isoprene-styrene triblock copolymer (SEPS), etc. These may be used alone or in combination of two or more.

The styrene-based hydrogenated block copolymers (SEBS, SEPS) may be produced using a general anionic living polymerization method.

The production method of the SEBS may include a method in which styrene, butadiene and styrene are sequentially polymerized to produce a triblock body, which is then hydrogenated, and a method in which a diblock copolymer of styrene-butadiene is prepared, and the diblock copolymer is converted to a triblock copolymer using a compatibilizer, and the triblock copolymer is subjected to hydrogenation. SEPS may be produced in the same manner as the above method except that isoprene is used instead of butadiene.

The thermoplastic elastomer according to the present disclosure has, for example, a melt flow rate (230° C., 2.16 kg load, ASTM D1238) of 0.5 g/10 mins to 150 g/10 mins, preferably, 0.7 g/10 mins to 100 g/10 mins, particularly preferably, 0.7 g/10 mins to 80 g/10 mins. When the melt flow rate is lower than 0.5 g/10 min, it may be difficult to secure high fluidity. When the melt flow rate exceeds 150 g/10 minutes, an appearance defect of the molded part may be caused.

The composition may contain about 5 parts by weight to about 30 parts by weight of the thermoplastic elastomer based on 100 parts by weight of the polypropylene resin. When the thermoplastic elastomer is contained in an content of the above range, the impact strength of the composition may be enhanced. In particular, a face impact strength may be enhanced. Specifically, when the content thereof is smaller than the range, the impact strength may decrease. When the content thereof exceeds the range, there may be limitation on fluidity and compatibility.

The polypropylene resin composition having the improved scratch resistance may further contain one additive selected from a group consisting of a compatibilizer, a slip agent, an antioxidant, a neutralizing agent, a light stabilizer, and combinations thereof.

The compatibilizer may act to improve compatibility between the aforementioned wool-like inorganic filler, and plate-like inorganic filler, needle-like inorganic filler and the polypropylene resin contained in the polypropylene resin composition having the improved scratch resistance, thereby increasing the compatibility and thus a dispersion, thus imparting excellent mechanical rigidity and impact resistance, and, at the same time, imparting dimensional stability to the composition.

Specifically, the compatibilizer may include a modified polyolefin resin in which a reactive group reactive with the inorganic filler is coupled to a main chain or a terminal of polyolefin. Examples of the reactive group may include maleic acid, maleic anhydride, carboxylic acid, hydroxyl group, vinyl acetate, glycidyl methacrylate, vinyl oxazoline, acrylic acid and the like.

Specifically, the modified polyolefin resin may contain about 1% to 3% by weight of the reactive group reactive with the inorganic filler coupled to the side chain. More specifically, when a content of the reactive group coupled to the side chain is smaller than the above range, the compatibility may decrease and thus the physical properties of the composition may decrease. Further, a substitution amount of the reactive group is small, such that an interfacial adhesion and dispersion efficiency between the compatibilizer and the inorganic filler contained in the polypropylene resin composition having the improved scratch resistance may be remarkably reduced. Conversely, when the content of the reactive group coupled to the side chain exceeds the above range, properties of the modified polypropylene contained in the polypropylene resin composition are easily changed and thus effect of increasing physical properties thereof is small and a production cost is high compared to an expected effect.

The compatibilizer may be contained in a content of about 0.1 parts by weight to about 3 parts by weight based on 100 parts by weight of the polypropylene resin, thereby increasing the compatibility between the inorganic filler and the resin and thus improving the dispersion, thereby imparting excellent mechanical rigidity and impact resistance, and, at the same time, imparting dimensional stability to the composition.

The slip agent may act to enhance lubricity during molding of the polypropylene resin composition having the improved scratch resistance, and may be one selected from a group consisting of siloxane-based slip agents, amide-based slip agents, and combinations thereof.

The antioxidant may be one selected from a group consisting of phenol-based antioxidants, phosphite-based antioxidants, thiodipropionate, and combinations thereof.

The polypropylene resin composition having the improved scratch resistance may contain calcium stearate, zinc oxide, etc. as the neutralizing agent. The polypropylene resin composition having the improved scratch resistance may contain a hindered amine-based light stabilizer.

In another implementation of the present disclosure, there is provided a molded interior part for a vehicle as an injection-molded part of the polypropylene resin composition with the improved scratch resistance. The composition may contain polypropylene resin, thermoplastic elastomer, and wool-like inorganic filler. The wool-like inorganic filler includes one selected from a group consisting of silica, aluminum oxide, calcium oxide, potassium oxide, magnesium oxide, sodium oxide, iron oxide, and combinations thereof via chemical bonds. The injection-molded part of the polypropylene resin composition with the improved scratch resistance may be used as a molded interior part for a vehicle. Thus, due to the wool-like inorganic filler, the molded interior part for a vehicle may have excellent impact resistance, and at the same time, have dimensional stability via low shrinkage and orientation control, and excellent scratch resistance.

Conventionally, in an injection molded product of a polypropylene resin composition, when the scratch resistance is improved, the impact resistance or rigidity may be degraded. However, in accordance with the present disclosure, the injection-molded part of the polypropylene resin composition having the improved scratch resistance may have excellent scratch resistance and, at the same time, may meet a high level of impact resistance and rigidity.

Specifically, the injection-molded part of the polypropylene resin composition having the improved scratch resistance may have excellent scratch resistance. Specifically, the injection-molded part of the polypropylene resin composition having the improved scratch resistance may have a $\Delta L$ value of 0.5 or lower in an Ericsson scratch resistance test.

Further, the injection-molded part of the polypropylene resin composition having the improved scratch resistance may have excellent impact strength not only at room temperature but also at low temperature. Specifically, the injection-molded part of the polypropylene resin composition having the improved scratch resistance may have an impact strength of about 45.0 Kgfcm/cm at room temperature and of about 5.0 Kgfcm/cm or greater at low temperature (about $-10°$ C.). Thus, the injection-molded part of the polypropylene resin composition having the improved scratch resistance may be prevented from cracking even in winter. The injection-molded part of the polypropylene resin composition with the improved scratch resistance may have excellent impact strength and has a rigidity of about 21500 kgf/cm$^2$ or greater, and thus may be used as a part material for a vehicle.

Further, the injection-molded part of the polypropylene resin composition with the improved scratch resistance may have excellent tensile strength of about 210 kgf/cm$^2$ or greater, and elongation of about 150% or greater and may have a thermal deformation temperature of about 125° C. or higher, and thus may be suitable as a molded interior part for a vehicle.

The polypropylene resin composition with the improved scratch resistance may simultaneously impart high fluidity, excellent mechanical rigidity, impact resistance and excellent dimensional stability to the molded part thereof. The molded interior part for the vehicle as the injection-molded part of the polypropylene resin composition with the improved scratch resistance may simultaneously have excellent moldability and excellent mechanical properties as well as excellent scratch resistance. A specific example of the interior part for the vehicle may include an interior pillar trim, an interior door trim, a glove box, a console and a crash pad.

Specifically, the molded interior part for the vehicle may be used as a vehicle crash pad which has a complicated three-dimensional structure having complex width and thickness and thus requires a high level of rigidity, impact resistance, heat resistance, dimensional stability, and scratch resistance.

Hereinafter, specific Present Examples of the present disclosure are presented. However, the Present Examples as described below are only intended for specifically illustrating or explaining the present disclosure and should not limit the present disclosure.

Present Example 1

An ethylene-propylene copolymer resin was used as a base material. In this connection, the ethylene-propylene copolymer resin had a melt flow rate of about 20 g/10 min as measured at a temperature of 230° C. and a load of 2.16 kg, and had a content of ethylene at about 8% by weight. An isotactic index thereof measured by 13C NMR was about 97. The ethylene-propylene copolymer resin had a molecular weight distribution (weight average molecular weight/number average molecular weight) of about 5. A content of the wool-like inorganic filler was about 20 parts by weight based on 100 parts by weight of the polypropylene resin. In this connection, the wool-like inorganic filler was made of silica. The wool-like inorganic filler had an average length of 200 nanometers and an average aspect ratio of 50. Further, an ethylene 1-octene copolymer was used as the thermoplastic elastomer. A content of the ethylene 1-octene copolymer was about 20 parts by weight of based on 100 parts by weight of the polypropylene resin. Thus, the polypropylene resin composition having improved scratch resistance was produced.

In addition, a maleic anhydride-modified polypropylene as the compatibilizer was contained in a content of about 1 part by weight, based on 100 parts by weight of the polypropylene resin.

The polypropylene resin composition having improved scratch resistance was extruded in a working condition of 200° C. to 240° C. using a twin screw extruder.

Present Example 2

A polypropylene resin composition having improved scratch resistance was produced in the same manner as in Present Example 1 except that a content of the wool-like inorganic filler was about 5 parts by weight based on 100 parts by weight of the polypropylene resin.

Present Example 3

A polypropylene resin composition having improved scratch resistance was produced in the same manner as in Present Example 1 except that a content of the wool-like inorganic filler was about 30 parts by weight based on 100 parts by weight of the polypropylene resin.

Present Example 4

A polypropylene resin composition having improved scratch resistance was produced in the same manner as in Present Example 1 except that a content of the thermoplastic elastomer was about 5 parts by weight based on 100 parts by weight of the polypropylene resin.

Present Example 5

A polypropylene resin composition having improved scratch resistance was produced in the same manner as in Present Example 1 except that a content of the thermoplastic elastomer was about 30 parts by weight based on 100 parts by weight of the polypropylene resin.

Present Example 6

A polypropylene resin composition having improved scratch resistance was produced in the same manner as in Present Example 1 except that a content of the compatibilizer was about 0.1 parts by weight based on 100 parts by weight of the polypropylene resin.

Present Example 7

A polypropylene resin composition having improved scratch resistance was produced in the same manner as in Present Example 1 except that a content of the compatibilizer was about 3 parts by weight based on 100 parts by weight of the polypropylene resin.

Present Example 8

A polypropylene resin composition having improved scratch resistance was produced in the same manner as in Present Example 1 except that a content of the wool-like inorganic filler was about 10 parts by weight based on 100 parts by weight of the polypropylene resin and a plate-like inorganic filler was contained in a content of about 10 parts by weight based on 100 parts by weight of the polypropylene resin.

Present Example 9

A polypropylene resin composition having improved scratch resistance was produced in the same manner as in Present Example 1 except that a content of the wool-like inorganic filler was about 10 parts by weight based on 100 parts by weight of the polypropylene resin and a needle-like inorganic filler was contained in a content of about 10 parts by weight based on 100 parts by weight of the polypropylene resin.

Comparative Example 1

A polypropylene resin composition having improved scratch resistance was produced in the same manner as in Present Example 1 except that, instead of the wool-like inorganic filler, a plate-like inorganic filler made of talc was contained in a content of about 20 parts by weight based on 100 parts by weight of the polypropylene resin.

Comparative Example 2

A polypropylene resin composition having improved scratch resistance was produced in the same manner as in Comparative Example 1 except that about 5 parts by weight of an amide-based slip agent (ER840, Chemko S.C. Corp) was further contained based on 100 parts by weight of the polypropylene resin.

Comparative Example 3

A polypropylene resin composition having improved scratch resistance was produced in the same manner as in Present Example 1 except that, instead of the wool-like inorganic filler, a needle-like inorganic filler made of whisker (magnesium hydroxide) was contained at about 20 parts by weight, based on 100 parts by weight of the polypropylene resin.

Comparative Example 4

A polypropylene resin composition having improved scratch resistance was produced in the same manner as in Comparative Example 3 except that about 5 parts by weight of an amide-based slip agent (ER840, Chemko S.C. Corp) was further contained based on 100 parts by weight of the polypropylene resin.

Comparative Example 5

A polypropylene resin composition having improved scratch resistance was produced in the same manner as in Present Example 1 except that a wool-like inorganic filler having an average length smaller than 100 nanometers instead of the wool-like inorganic filler having an average length of 200 nanometers was contained at about 20 parts by weight based on 100 parts by weight of the polypropylene resin.

Comparative Example 6

A polypropylene resin composition having improved scratch resistance was produced in the same manner as in Present Example 1 except that a content of the wool-like inorganic filler was about 3 parts by weight based on 100 parts by weight of the polypropylene resin.

Comparative Example 7

A polypropylene resin composition having improved scratch resistance was produced in the same manner as in Present Example 1 except that a content of the wool-like inorganic filler was about 35 parts by weight based on 100 parts by weight of the polypropylene resin.

Comparative Example 8

A polypropylene resin composition having improved scratch resistance was produced in the same manner as in Present Example 1 except that a content of the thermoplastic elastomer was about 3 parts by weight based on 100 parts by weight of the polypropylene resin.

Comparative Example 9

A polypropylene resin composition having improved scratch resistance was produced in the same manner as in Present Example 1 except that a content of the thermoplastic elastomer was about 35 parts by weight based on 100 parts by weight of the polypropylene resin.

Present Example 10

A polypropylene resin composition having improved scratch resistance was produced in the same manner as in Present Example 1 except that a content of the compatibilizer was about 0.05 parts by weight based on 100 parts by weight of the polypropylene resin.

Present Example 11

A polypropylene resin composition having improved scratch resistance was produced in the same manner as in Present Example 1 except that a content of the compatibilizer was about 5 parts by weight based on 100 parts by weight of the polypropylene resin.

Evaluations

Extrusions of the resin compositions as produced in the Present Examples and Comparative Examples were injection-molded to produce specimens complying with an ASTM standard, respectively. Following physical properties thereof were measured. Measurement results are shown in a following [Table 1].

Experimental Example 1. Specific Gravity (g/cm$^3$)

A specific gravity of each of the specimens produced in Present Examples and Comparative Examples was measured according to ASTM D 792. Measurement results are shown in the [Table 1].

Experimental Example 2. Tensile Strength (Kgf/cm$^2$) and Elongation (%)

A tensile strength and an elongation of each of the specimens produced in Present Examples and Comparative Examples were measured using ASTM D 638 at 23° C. For measurement, a load application rate was 50 mm/min, and a specimen type was TYPE-I of ASTM 638. Measurement results are shown in the [Table 1].

Experimental Example 3. Flexural Modulus (Kgf/cm$^2$)

A flexural modulus of each of the specimens produced in the Present Examples and Comparative Examples was measured using ASTM D 790 under a condition of a rate of 10 mm/min. In the measuring, a thickness of each specimen was 6.4 mm, and a support span distance was 50 mm. Measurement results are shown in the [Table 1].

Experimental Example 4. Izod Impact Strength (Kgfcm/cm)

Each of the specimens produced in the Present Examples and Comparative Examples was notched and measured in at room temperature (23° C.) and −10° C. under ASTM D 256. Then, break of each specimen during the measurement was identified. Measurement results are shown in the [Table 1].

Experimental Example 5. Thermal Deformation Temperature (° C.)

Each of the specimens produced in Present Examples and Comparative Examples and having a 6.4 mm thickness was measured under ASTM D 648 at a load of 4.6 kgf/cm$^2$. Measurement results are shown in the [Table 1].

Experimental Example 6. Deformation

Each of the specimens (300 mm×100 mm×2 m) of Present Examples and Comparative Examples was injection-molded. Then, in 48 hours, twist of each molded piece was evaluated. Specifically, in a specimen having a cross-sectional area represented by lengths in X-axis and Y-axis directions and having a Z-axis length (thickness), lengths thereof at the highest and lowest points in the Z-axis direction relative to the cross-sectional area were measured. Measurement results are shown in the [Table 1].

Experimental Example 7. Ericsson Scratch Test

A scratch resistance was evaluated by applying a scratch to each specimen using a scratch resistance tester (Ericsson) and measuring a difference between brightness of the specimen before and after the scratch.

In this test, a set load was 10N and a test rate was 1,000 mm/min. After cross-cutting the specimen at an 2×20 mm spacing, brightness thereof was measured with a photometer. Then, the difference between the brightness before and after the scratch was calculated.

TABLE 1

| Examples | Specific gravity (g/cm$^3$) | Tensile strength (Kgf/cm$^2$) | Elongation (%) | Flexural modulus (Kgf/cm$^2$) | Impact strength at room temperature (Kgf/cm$^2$) | Impact strength at −10° C. (Kgf/cm$^2$) | Thermal deformation temperature (° C.) | Deformation on (mm) (100 mm × 300 mm × 2 mm) | Scratch resistance (ΔL) |
|---|---|---|---|---|---|---|---|---|---|
| Present Example 1 | 1.023 | 215 | 180 | 22510 | 55 | 8.6 | 128 | 0.7 | 0.34 |
| Present Example 2 | 0.934 | 219 | 260 | 21804 | 59 | 8.9 | 127 | 0.4 | 0.18 |
| Present Example 3 | 1.085 | 211 | 155 | 23075 | 51 | 8.2 | 130 | 0.9 | 0.49 |
| Present Example 4 | 1.028 | 218 | 150 | 23186 | 48 | 7.9 | 130 | 0.8 | 0.22 |
| Present Example 5 | 1.020 | 213 | 320 | 21535 | 62 | 9.2 | 126 | 0.5 | 0.44 |
| Present Example 6 | 1.022 | 216 | 185 | 21997 | 57 | 8.8 | 128 | 0.8 | 0.42 |
| Present Example 7 | 1.022 | 226 | 180 | 22978 | 46 | 7.6 | 129 | 0.6 | 0.12 |
| Present Example 8 | 1.021 | 213 | 220 | 22675 | 54 | 8.6 | 128 | 0.8 | 0.48 |
| Present Example 9 | 1.023 | 218 | 165 | 28813 | 49 | 7.9 | 131 | 1.0 | 0.48 |
| Comparative Example 1 | 1.023 | 204 | 270 | 22014 | 52 | 8.2 | 127 | 1.3 | 7.24 |
| Comparative Example 2 | 1.024 | 199 | 250 | 21875 | 47 | 7.4 | 126 | 1.3 | 0.82 |
| Comparative Example 3 | 1.023 | 228 | 5 | 35665 | 58 | 8.6 | 138 | 1.9 | 0.72 |
| Comparative Example 4 | 1.023 | 222 | 5 | 33115 | 52 | 8.2 | 136 | 1.9 | 0.34 |
| Comparative Example 5 | 1.023 | 208 | 145 | 21123 | 45 | 7.5 | 126 | 1.1 | 0.36 |
| Comparative Example 6 | 0.930 | 220 | 280 | 20746 | 63 | 9.1 | 124 | 0.3 | 0.16 |
| Comparative Example 7 | 1.088 | 205 | 135 | 24812 | 41 | 7.4 | 132 | 0.9 | 0.66 |
| Comparative Example 8 | 1.028 | 218 | 120 | 23942 | 32 | 6.2 | 131 | 0.9 | 0.21 |
| Comparative Example 9 | 1.020 | 208 | 350 | 20022 | 68 | 9.5 | 123 | 0.4 | 0.52 |
| Comparative Example 10 | 1.023 | 207 | 190 | 20423 | 30 | 8.9 | 124 | 0.7 | 0.52 |
| Comparative Example 11 | 1.023 | 220 | 180 | 23577 | 38 | 6.9 | 131 | 0.6 | 0.12 |

It may be identified from the results of the above Table 1 that the polypropylene resin compositions with improved scratch resistance according to the Present Examples impart excellent scratch resistance, and excellent mechanical rigidity and impact resistance, and dimensional stability to the molded part, compared to the polypropylene resin compositions according to the Comparative Examples, and thus may be used for an interior part for a vehicle.

What is claimed is:

1. A polypropylene resin composition having improved scratch resistance, the composition containing a polypropylene resin, a thermoplastic elastomer, a wool-like inorganic silica,
    wherein the wool-like inorganic silica has an average length of 200 nanometers or greater, and an average aspect ratio of 50 or greater, and
    wherein a content of the wool-like inorganic silica is in a range of 5 to 30 parts by weight, based on 100 parts by weight of the polypropylene resin,
    wherein the polypropylene resin composition has a ΔL value of 0.5 or lower in an Ericsson scratch resistance test.

2. The polypropylene resin composition of claim 1, wherein the polypropylene resin contains 5% to 10% by weight of ethylene,
    wherein the polypropylene resin has a molecular weight distribution defined as weight average molecular weight/number average molecular weight in a range of 4 to 6.

3. The polypropylene resin composition of claim 1, wherein a content of the thermoplastic elastomer is in a range of 5 to 30 parts by weight, based on 100 parts by weight of the polypropylene resin.

4. The polypropylene resin composition of claim 1, wherein the thermoplastic elastomer includes at least one selected from a group consisting of a polyolefin-based rubber, and a styrene-based hydrogenated block copolymer rubber.

5. The polypropylene resin composition of claim 1, wherein the composition further contains a compatibilizer in a content of 0.1 to 3 parts by weight, based on 100 parts by weight of the polypropylene resin.

6. The polypropylene resin composition of claim 1, wherein the composition further contains at least one selected from a plate-like inorganic filler and a needle-like inorganic filler.

7. A molded part as a part for a vehicle, the molded part including an injection-molded part of the polypropylene resin composition having the improved scratch resistance according to claim 1.

* * * * *